US011010413B2

(12) United States Patent
Hall et al.

(10) Patent No.: US 11,010,413 B2
(45) Date of Patent: *May 18, 2021

(54) GENERATION OF SUPPORT DATA RECORDS USING NATURAL LANGUAGE PROCESSING

(71) Applicant: BMC Software, Inc., Houston, TX (US)

(72) Inventors: Jonathan William Hall, Deal (GB); Sun Chun Chu, Richmond Hill (CA); Troy Cline, Leander, TX (US); Nilesh Phadke, Pune (IN)

(73) Assignee: BMC Software, Inc., Houston, TX (US)

(\*) Notice: Subject to any disclaimer, the term of this patent is extended or adjusted under 35 U.S.C. 154(b) by 749 days.

This patent is subject to a terminal disclaimer.

(21) Appl. No.: 15/864,712

(22) Filed: Jan. 8, 2018

(65) Prior Publication Data

US 2018/0129735 A1 May 10, 2018

Related U.S. Application Data

(63) Continuation of application No. 14/674,742, filed on Mar. 31, 2015, now Pat. No. 9,864,798.
(Continued)

(51) Int. Cl.
*G06N 7/00* (2006.01)
*G06F 16/33* (2019.01)
(Continued)

(52) U.S. Cl.
CPC ...... *G06F 16/3344* (2019.01); *G06F 16/3346* (2019.01); *G06F 16/345* (2019.01);
(Continued)

(58) Field of Classification Search
CPC ............ G06F 17/30684; G06F 17/243; G06F 17/2715; G06F 17/278; G06F 17/2785;
(Continued)

(56) References Cited

U.S. PATENT DOCUMENTS

2008/0172574 A1\* 7/2008 Fisher ............... G06Q 10/06
714/25
2009/0063386 A1\* 3/2009 Hibbets ............ G06Q 10/10
706/50
(Continued)

OTHER PUBLICATIONS

Gupta et al., "Automating ITSM Incident Management Process", IEEE International Conference on Automonic Computing, 2008. (Previously Supplied). (Year: 2008).\*
(Continued)

*Primary Examiner* — Dave Misir
(74) *Attorney, Agent, or Firm* — Brake Hughes Bellermann LLP

(57) ABSTRACT

A view generator receives support text characterizing a support requirement for available information technology (IT) support, the support text being received in sentence form via a graphical user interface (GUI). A text analyzer performs natural language processing on the support text and thereby identifies at least one sentence part and at least one named entity within the support text. A support record generator relates each of the at least one sentence part and the at least one named entity to a support record type, and generates a support data record for the support requirement, including filling individual fields of the support data record using the at least one sentence part and the at least one named entity.

19 Claims, 8 Drawing Sheets

Related U.S. Application Data

(60) Provisional application No. 62/053,496, filed on Sep. 22, 2014.

(51) Int. Cl.
 *G06F 16/34* (2019.01)
 *G06F 16/35* (2019.01)
 *G06Q 10/00* (2012.01)
 *G06Q 10/06* (2012.01)
 *G06F 40/30* (2020.01)
 *G06F 40/174* (2020.01)
 *G06F 40/216* (2020.01)
 *G06F 40/295* (2020.01)

(52) U.S. Cl.
 CPC .......... *G06F 16/353* (2019.01); *G06F 40/174* (2020.01); *G06F 40/216* (2020.01); *G06F 40/295* (2020.01); *G06F 40/30* (2020.01); *G06N 7/005* (2013.01); *G06Q 10/06315* (2013.01); *G06Q 10/20* (2013.01)

(58) Field of Classification Search
 CPC ......... G06F 17/30687; G06F 17/30707; G06F 17/30719; G06F 16/3344; G06F 16/353; G06F 16/3346; G06F 16/345; G06F 40/216; G06F 40/295; G06F 40/30; G06F 40/174; G06N 7/005; G06N 5/02; G06N 5/04; G06Q 10/20; G06Q 10/06315
 USPC .......................................... 706/46; 707/739
 See application file for complete search history.

(56) References Cited

U.S. PATENT DOCUMENTS

| | | | |
|---|---|---|---|
| 2009/0313219 A1* | 12/2009 | Gupta | G06Q 10/10 |
| 2010/0274618 A1* | 10/2010 | Byrd | H04M 3/51 704/275 |
| 2012/0209606 A1* | 8/2012 | Gorodetsky | G10L 15/26 704/235 |
| 2013/0262082 A1* | 10/2013 | McKeeman | G06F 17/27 704/9 |
| 2013/0282725 A1* | 10/2013 | Rubinger | G06Q 10/20 707/740 |
| 2013/0290366 A1* | 10/2013 | Boyle | G06F 17/30672 707/767 |
| 2014/0337010 A1* | 11/2014 | Akolkar | G06F 16/243 704/9 |

OTHER PUBLICATIONS

Extended European Search Report received for EP Patent Application No. 15185982.4, dated Dec. 21, 2015, 9 pages.

Gupta et al.; "Automating ITSM Incident Management Process", IEEE International Conference on Automonic Computer, 2008, 10 pages.

* cited by examiner

| Identified Sentence Part 501 | Service Request Weighting 502 | Incident Weighting 504 | Change Request Weighting 506 |
|---|---|---|---|
| {type: person} needs | 0.80 | 0.15 | 0.05 |
| {type: person} would like | 0.70 | 0.08 | 0.22 |
| {type: person} cannot | 0.15 | 0.80 | 0.05 |
| {type: person} can't | 0.15 | 0.80 | 0.05 |
| {type: verb} can't | 0.15 | 0.80 | 0.05 |
| {type: verb} Open | 0.34 | 0.33 | 0.33 |

FIG. 5

| Identified Named Entity type appearing in text 601 | Service Request Weighting 602 | Incident Weighting 604 | Change Request Weighting 606 |
|---|---|---|---|
| Customer's assigned laptop | 0.39 | 0.51 | 0.10 |
| Datacenter Server | 0.10 | 0.30 | 0.60 |
| Non-IT employee as customer | 0.60 | 0.40 | 0 |

FIG. 6

| Computed probability of most likely record type | Action |
|---|---|
| 70%-100% | Automatically select. Allow retrospective correction |
| 50%-100% | Present user with pre-selected option for most likely record type, with option to effect on-click confirmation or to select from list of other record types ordered by probability |
| Under 50% | Present user with open selection of record type |

FIG. 9

| Record Type | Mapping for Named Entity object "Customer's assigned laptop" |
|---|---|
| Incident | Related configuration items (asset record) |
| Request | "Tag Number" Field on incident (Asset's tag number) |
| Request for Change | No mapping |

FIG. 10

GENERATION OF SUPPORT DATA RECORDS USING NATURAL LANGUAGE PROCESSING

CROSS REFERENCE TO RELATED APPLICATIONS

This application is a continuation of, and claims priority to, U.S. patent application Ser. No. 14/674,742, filed on Mar. 31, 2015, entitled, "GENERATION OF SUPPORT DATA RECORDS USING NATURAL LANGUAGE PROCESSING" which claims the benefit of U.S. Provisional Application No. 62/053,496, filed on Sep. 22, 2014, and titled "Generation of Support Data Records Using Natural Language Processing", which are hereby incorporated by reference in their entireties.

TECHNICAL FIELD

This description relates to the providing of Information Technology (IT) support.

BACKGROUND

Information technology (IT) generally includes any scenario in which computers and related technologies are deployed to facilitate a productivity, convenience, or enjoyment of a user or a group of users. In many cases, however, such users do not possess sufficient technical skills to fully realize associated benefits. Moreover, even when users have required technical skills, the use of computer hardware and software deployed within an IT landscape may be subject to organizational rules and other constraints imposed by a deploying organization.

As a result, users may not be capable of utilizing IT resources in a desired or required fashion. Thus, IT support professionals are often tasked with providing service and other support to such users. For example, users may require assistance with malfunctioning hardware or software, or may be unable to complete a required upgrade or other modification with respect to such hardware or software.

In a typical workflow for providing IT support, an IT support professional generally interacts with the user in question, and works to determine a type of support that may be required, along with associated details that may be useful in providing the required support. Further, the IT support professional may create a data record that captures all such gathered information in a standardized format. By creating such data records, it is relatively straightforward, for example, to track a progress over time toward resolution for the user, to compare the currently-required support with similar, previous support instances, and to facilitate potential involvement of a second IT support professional (if needed).

SUMMARY

According to one general aspect, a system includes instructions stored on a non-transitory computer readable storage medium and executable by at least one processor. The system includes a view generator configured to cause the at least one processor to receive support text characterizing a support requirement for available information technology (IT) support, the support text being received in sentence form via a graphical user interface (GUI). The system includes a text analyzer configured to cause the at least one processor to perform natural language processing on the support text and thereby identify at least one sentence part and at least one named entity within the support text. The system includes a support record generator configured to cause the at least one processor to relate each of the at least one sentence part and the at least one named entity to a support record type, and further configured to cause the at least one processor to generate a support data record for the support requirement, including filling individual fields of the support data record using the at least one sentence part and the at least one named entity.

According to another general aspect, a method includes receiving support text characterizing a support requirement for available information technology (IT) support, the support text being received in sentence form via a graphical user interface (GUI). The method includes identifying at least one sentence part within the support text, calculating a sentence part score relating the at least one sentence part to at least on support type of the available IT support, and identifying at least one named entity within the support text, including executing a query against support-related data, using the support text. The method further includes calculating a named entity score relating the at least one named entity to the at least one support type, and filling the at least one sentence part and the at least one named entity within corresponding fields of a support data record of the at least on support type.

According to another general aspect, a computer program product includes instructions recorded on a non-transitory computer readable storage medium and configured, when executed by at least one semiconductor processor, to cause the at least one semiconductor processor to receive support text characterizing a support requirement for available information technology (IT) support, the support text being received in sentence form via a graphical user interface (GUI). The instructions, when executed, further cause the at least one semiconductor processor to identify at least one sentence part within the support text, and calculate a sentence part score relating the at least one sentence part to at least on support type of the available IT support. The instructions, when executed, further cause the at least one semiconductor processor to identify at least one named entity within the support text, including executing a query against support-related data, using the support text, calculate a named entity score relating the at least one named entity to the at least one support type, and fill the at least one sentence part and the at least one named entity within corresponding fields of a support data record of the at least on support type.

The details of one or more implementations are set forth in the accompanying drawings and the description below. Other features will be apparent from the description and drawings, and from the claims.

BRIEF DESCRIPTION OF THE DRAWINGS

FIG. 5 is a table illustrating example scoring operations for sentence parts in the system of FIG. 1.

FIG. 6 is a table illustrating example scoring operations for named entities in the system of FIG. 1.

FIG. 9 is a table illustrating example techniques for presenting and confirming identified support record types.

FIG. 10 is a table illustrating example techniques for populating data fields of support records.

DETAILED DESCRIPTION

Figure 1:
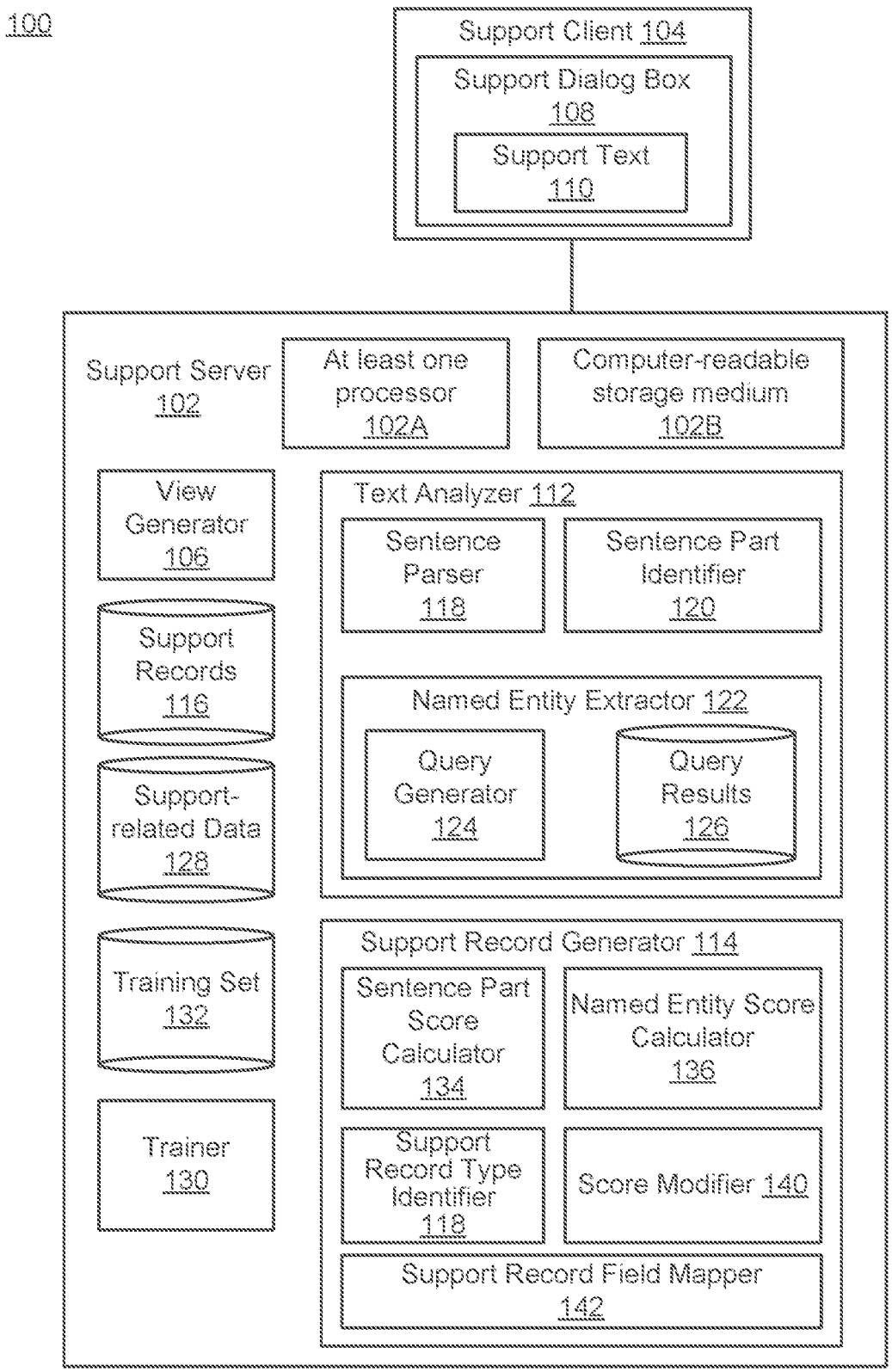
FIG. 1 is a block diagram of a system for providing IT support.

FIG. 1 is a block diagram of a system 100 for providing IT support. In the example of FIG. 1, a support server 102 facilitates the providing of IT support to one or more users, in conjunction with a support client 104. More particularly, as described in detail below, the support server 102 enables fast, convenient, and accurate description of an IT task to be performed. Moreover, the support server 102 may be configured to transform such a description into one or more support data records that may be used, as referenced above, to facilitate prompt and complete resolution of the IT support task in question.

In operation, the support server 102 and the support client 104 may operate either locally or remotely with respect to one another. In example embodiments, an IT support professional may utilize the support client 104 while interacting with a user (e.g., customer, consumer, or employee) who requires support, and/or while utilizing a problem description received from such a user.

For example, as shown, the support server 102 may include a view generator 106 that is configured to provide a support dialog box 108 in conjunction with a graphical user interface (GUI) associated with the support client 104. In the example of FIG. 1, the support dialog box 108 is illustrated as including support text 110, which represents text providing the problem description referenced above. More specifically, as described in detail below, the support dialog box 108 may be implemented as a single dialog box configured to capture all required text of an associated problem description. In other implementations, however, some of which are described below, various other techniques may be utilized to capture text associated with the problem description.

In further detail, as shown, the support server 102 may include a text analyzer 112 that is configured to analyze the support text 110, to thereby identify portions thereof that are determined to be potentially instrumental in enabling a support record generator 114 to generate a plurality of support records 116. In this regard, as referenced above and described in more detail below, the support records 116 generally represent individual data records stored in their appropriate table or other database or repository, where such support records each correspond with at least one of the various types of support data records that may be relevant to the practice of providing user support within an IT landscape.

Thus, by way of non-limiting example, the support records 116 may include general customer requests, customer support tickets, and other records defined with respect to established IT service management standards. For example, such IT service management standards may include incident tickets, problem records, known errors, requests for change (RFCs), and work orders. For example, a required format for the support records 116 may be implemented based on common framework standards, such as, for example, the IT infrastructure library (ITIL).

In practice, various techniques and scenarios for providing IT support are well known. To provide a few non-limiting examples, it may occur that the IT support professional, also referred to herein as a support provider, is engaged in current interaction with one or more users. For example, the support provider may interact with a user by way of telephone, email, or chat functionality. Thus, such communication may be synchronous or a-synchronous. For example, in some scenarios, the IT support provider may actively elicit the support text 110 from a user, and may therefore enter the support text 110 into the support dialog box 108. In other implementations, the IT support provider may receive some or all of the support text 110 by way of an electronic transmission received from the user. In some implementations, the IT support provider and the user may be co-located, perhaps utilizing a single computing device. In other cases, the support provider may utilize a local computing device to remotely access or control the computing device of the user. In the latter scenarios, the user device being controlled is typically the device requiring IT support. In other implementations, however, the user may or may not be utilizing the device requiring support.

In these and many other potential scenarios, some of which are referenced below, the support server 102 utilizes the support text 118 to automatically create a corresponding support record of the support records 116. As described, such a support record may then be used as a basis for managing or resolving delivery of a particular service or other IT support function, such as a resolution of an IT issue, or a managed action and review of a requested or required change.

More particularly, the support server 102, e.g., the text analyzer 112 and the support record generator 114, may be configured to determine a required record type, from among a selection that is available and relevant to the IT environment in which the support provider is working. For example, in an IT service context, the support server 102 may determine whether a relevant record type is one related to resolution of a service outage (also referred to as an incident), or a request to perform a piece of routine service activity that is not related to an unexpected issue, often referred to as a work order.

The support server 102 may further be configured to assist the IT support provider in gathering of certain types of support information from the user, without which the resulting support record may be incomplete. Additionally, or alternatively, the IT support server 102 may collect such information directly from the user, independently of the support provider. Types of information referenced here may include, e.g., common discrete pieces of information, such as an identity of the user, or specific identifiers of any related assets or other items (e.g., a unique identification or name of a specific computer or other piece of hardware, in the context of identifying a technical issue related thereto).

In practice, such information may vary widely, in accordance with a type of IT support issue and associated record type. Moreover, particularly when users are permitted to enter the support text 110 directly, the support text 110 may include an overly or needlessly verbose description of the IT task to be performed and/or issue to be resolved. Nonetheless, as described in detail herein, the support server 102 may be configured to obtain and utilize the support text 110 in a manner that facilitates fast, accurate, complete, and partially or completely automatic generation of the support records 116.

In order to provide these and other features, as already referenced, the support server 102 may include a view generator 106 that provides the support dialog box 108. In specific implementations, the support dialog box 108 may represent a single field for entry of the support text 110 at the support client 104. In other words, the support client 104 does not require, but may utilize if desired, any other type of entry mechanism for obtaining the support text 110, including, for example, dropdown menus, multiple discrete/defined text entry fields, or any other known of future technique for capturing the support text 110 from the user.

Advantageously, in such implementations in which only the single support dialog box 108 is utilized, the user and/or the support provider may experience a reduction or prevention of a need to actively switch between fields or screens of the support client 104. As a result, for example, the support text 110 may be received in a smooth and natural manner, without interruption caused by any requirement to move between different screen items, or different screens.

Once the support text 110 has been received, or as the support text 110 is being received in real-time or near real-time, the text analyzer 112 may proceed to analyze the support text 110, e.g., using particular naturalized language processing techniques. To facilitate and enable these and various other advantages, the text analyzer 112 may be configured to interpret the support text 110, using language analysis, such as natural language processing (NLP). For example, a sentence parser 118 of the text analyzer 112 may be configured to analyze individual sentences of the support text 110, and identify individual words, punctuation marks, numbers, or any other included symbols, while removing spaces, paragraph breaks, or any other unnecessary portions of the support text 110.

Using the output of the sentence parser 118, a sentence part identifier 120 may identify individual words, phrases, abbreviations, numbers, or other identifiable sentence parts. For example, as described in more detail below, the sentence part identifier 120 may compare individual output from the sentence parser 118 with a table of pre-identified sentence parts, to thereby label at least some of the individual outputs of the sentence parser 118 in accordance with the table. For example, a word identified by the sentence parser 118 may be mapped to such a table for identification of the word as a verb, noun, or other part of speech, or as a name. Similarly, a number may be mapped to identify the number as an IP address, or as a model number for a particular type of hardware. Of course, additional or alternative techniques may be used to implement the sentence part identifier 120, some of which are described in more detail below.

Meanwhile, a named entity extractor 122 may be configured to receive outputs of the sentence parser 118 and/or the sentence part identifier 120. As shown, a query generator 124 of the named entity extractor 122 may be configured to generate query results 126 by executing one or more queries against various types of support-related data 128. More specifically, and as also described in more detail below, the named entity extractor 122 is operable to identify, in a fast and accurate fashion, a potentially large number of entities named within the support-related data 128, even in scenarios in which some or all of the support-related data 128 is known to change over time.

For example, as referenced above, the sentence parser 118 may identify a word that the sentence part identifier 120 identifies as a name. Then, the query generator 124 may execute a query against the support-related data 128, whereupon the query results 126 may indicate that the name belongs to a customer identified as such within the support-related data 128. Of course, in the example, the named entity extractor 122 could also execute the just-described search based directly on an output of the sentence parser 118, as well.

Although the support-related data 128 is illustrated in the simplified example of FIG. 1 as being a single element within the support server 102, it should be appreciated that the support-related data 128 generally represents any potential, relevant data source of a potential plurality of data sources that may contain data useful to the named entity extractor 122, and, moreover, any or all such data sources may be located remotely from the support server 102. For example, the support-related data 128 may include virtually any organizational data owned or accessible by an organization deploying the support server 102. In other examples, the support-related data 128 could also include virtually any publicly-available information that may be useful to the named entity extractor 122 in identifying named entities of interest.

The support record generator 114 may thus be configured to receive the identified sentence parts from the sentence part identifier 120, as well as the named entities from the named entity extractor 122, to thereby generate the support records 116 (or, at least, to provide an initial version thereof that is sufficient to facilitate and enable ongoing IT support efforts for one or more support requirements associated with the support text 110). In other words, in at least some implementations, the support record generator 114 is generally configured to receive identified sentence parts and named entities, and to classify the received sentence parts and named entities with respect to specific types of support records 116, and/or with respect to specific fields of individual support records.

To facilitate these and related operations, in the example of FIG. 1, a trainer 130 is illustrated in conjunction with a training set 132, and may be utilized to implement one or more machine-learning algorithms, to thereby enable the just-referenced classification functions of the support record generator 114. For example, as referenced in more detail below, the training set 132 may generally represent a plurality of support records, such as a subset of the support records 116, and/or any other data that may be considered to be useful or representative with respect to classifying portions of the support text 110.

Then, the trainer 130 may be configured, perhaps in conjunction with human assistance, to include labels within the training set 132 and in conjunction with data included therein, to thereby enable the types of classification procedures referenced above and described in detail below with respect to the support record generator 114. Such training and associated classification techniques may be implemented using a variety of known or future techniques, some of which are referenced in more detail, below.

For example, such techniques may include the use of one or more machine learning and/or data mining algorithms. By way of non-limiting example, such algorithms may include, e.g., support vector machines (SVM), Bayesian networks, neural networks, regression-based networks, decision tree learning algorithms, or combinations thereof. In some such scenarios, or related scenarios, the training set 132 may include existing support records that have already been labeled in a manner to facilitate operations of the support record generator 114 (e.g., for supervised machine learning), while, in other implementations, the training set 132 may include initially-unlabeled support records, which may be utilized by the trainer 132 to deduce relevant data structures therein (e.g., for unsupervised learning).

Thus, in the example of FIG. 1, the support record generator 114 includes a sentence part score calculator 134 and a named entity score calculator 136. As the names imply, the sentence part score calculator 134 may be configured to calculate a score for each sentence part provided by the sentence part identifier 120, while the named entity score calculator 136 may similarly be configured to provide a score for each named entity provided by the named entity extractor 122. That is, as described in detail below, each such calculated score may generally indicate a relative likelihood that a corresponding sentence part or named entity should be associated with a particular type of support record, or individual field thereof.

Consequently, a support record type identifier 138 may be configured to receive calculated scores from the score calculators 134, 136, and calculate therewith an aggregated likelihood that the support text 110 is related to one or more specific types of support records, or individual fields thereof. For example, in a highly simplified scenario, the sentence part score calculator 134 may indicate that a particular sentence part identified by the sentence part identifier 120 is 70% likely to be associated with a "work order" support record, and 30% likely to be associated with a "request for change" support record. Meanwhile, the named entity score calculator 136 may indicate that a named entity provided by the named entity extractor 122 is 80% likely to be associated with a "work order" support record, and 20% is likely to be associated with a "service request" support record. Then, in the aggregate simplified example, the support record type identifier 138 may determine that the support text 110 from which the relevant sentence part and named entity were determined may be highly likely to be associated with a "work order" support record.

Thus, the sentence part score calculator 134 provides a sentence part score for the sentence parts, the sentence part score representing a probabilistic determination that a given sentence part is associated with each of a first plurality of support record types. Similarly, the named entity score calculator 136 provides a named entity score for the named entities, the named entity score representing a probabilistic determination that each named entity is associated with each of a second plurality of support record types. That is, although not explicitly shown in the examples provided herein, the support record types identified by the sentence part score calculator 134 need not align exactly with those identified by the named entity score calculator 136.

As may be appreciated from the above description of the trainer 130 and the training set 132, all of the sentence parts score calculator 134, the named entity score calculator 136, and the support record type identifier 138 may be implemented using one or more trained classifiers implementing the types of machine-learning or data mining algorithms referenced above. That is, for example, in some cases, individual algorithms or other techniques may be selected for implementation by individual ones of the sentence part score calculator 134, the named entity score calculator 136, and the support record type identifier 138. Further, in some implementations, more simplistic techniques may be used. For example, the support record type identifier 138 may be executed using weighted or other parameterized aggregations of the various scores provided by the score calculators 134, 136, without requiring separate training by the trainer 130.

In some implementations, as referenced above and described in more detail below, the support record generator 114 may facilitate human involvement of varying types and extent during generation of the support records 116. For example, a score modifier 140 may be configured to enable a user of the system 100 to make adjustments to some or all of the scores provided by the score calculators 134, 136 and/or the record types identified by the support record type identifier 138. Specific examples of such score adjustments are provided below, e.g., with respect to FIGS. 4 and 7-9.

Finally with respect to the support record generator 114, a support record field mapper 142 may be configured to map specific portions of the support text 110 into individual data fields of instances of support records of the support record type identified by the support record type identifier 138, and in conjunction with scores calculated by the score calculators 134, 136. That is, the support record field mapper 142 may be configured to map a label identifying a sentence part and a name of a named entity to corresponding, individual fields of the support record. Thus, in some implementations, the resulting support records 116 should be virtually indistinguishable from support records of the same support type generating using conventional techniques. In other words, support records provided by the support record field mapper 142 should be entirely compatible with existing IT support infrastructure.

In operation, the support record field mapper 142 may be configured to produce entire, completed support records for inclusion with the support records 116. In other implementations, however, and depending on content of the original support text 110, the support record field mapper 142 may generate one or more initial support records having one or more empty or incorrect data fields included therein. In such cases, the support record field mapper 142 may be configured to interact, e.g., with either an administrator or other user of the support dialog box 108, or of the system 100 in general, in order to complete one or more specific support records for inclusion thereof within the support records 116.

In the example of FIG. 1, the support server 102 is illustrated as a single server that includes at least one processor 102A and non-transitory computer readable storage medium 102B. As may be appreciated, the support server 102 may of course represent two or more support servers in communication with one another. Similarly, the at least one processor 102A should be understood to represent two or more processors operation in parallel, any one or more of which may be configured to execute instructions stored on the non-transitory computer readable storage medium 102B in order to obtain, e.g., the view generator 106, the text analyzer 112, and the support record generator 114.

Somewhat similarly, the various modules of the support server 102 illustrated in the example of FIG. 1 are illustrated as separate, discrete modules in communication with one another, as needed. In various implementations, however, each such individual module may be implemented as two or more sub-modules in communication with one another, or, conversely, any two or more such modules may be implemented as a combined, single module.

Figure 2:
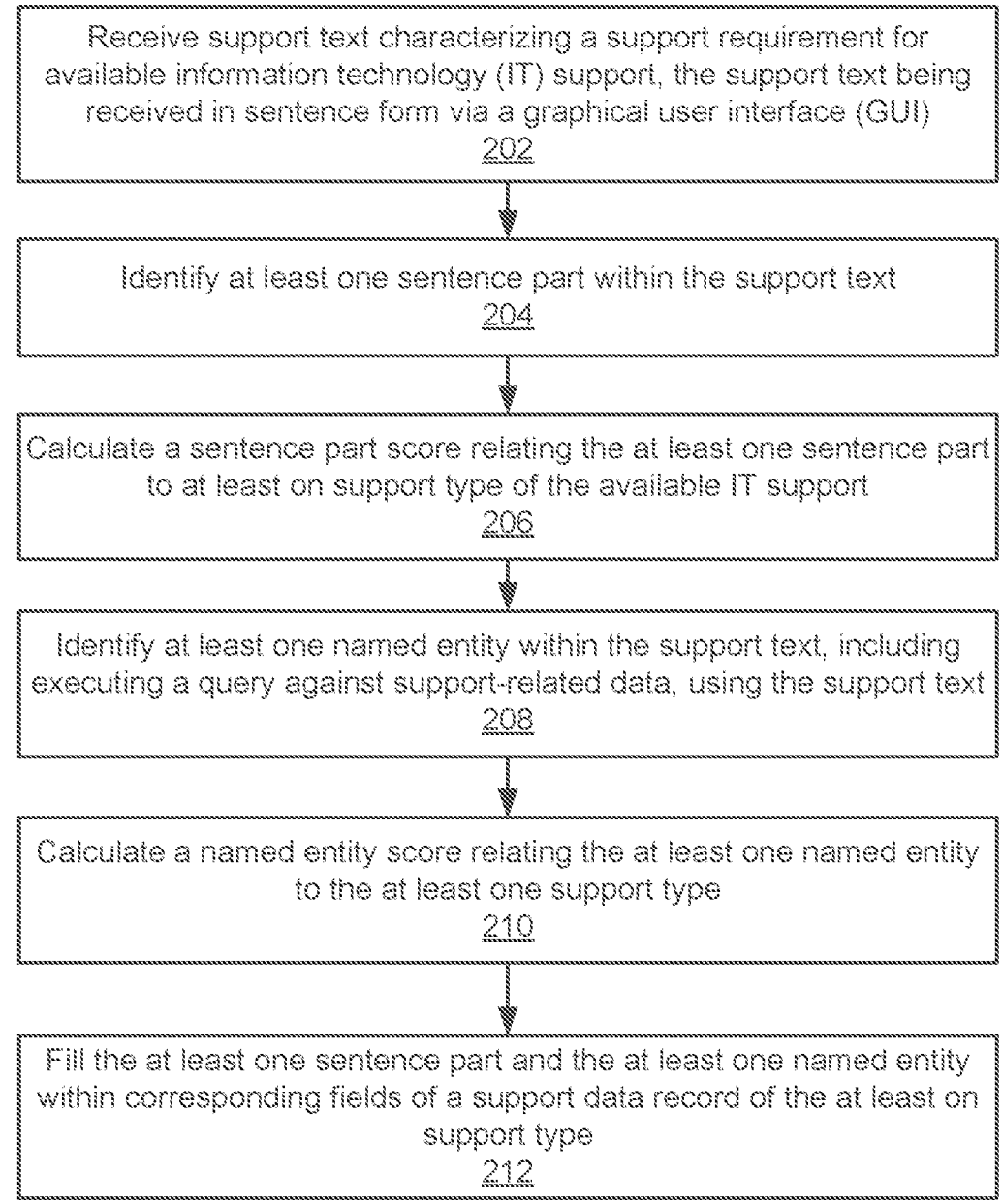
FIG. 2 is a flowchart illustrating example operations of the system of FIG. 1.

FIG. 2 is a flowchart 200 illustrating example operations of the system 100 of FIG. 1. In the example of FIG. 2, operations 202-212 are illustrated as separate, sequential operations. However, it may be appreciated that, in alternative implementations, one or more additional or alternative operations may be included, while one or more such operations may be omitted and any or all such implementations of the flowchart 200, as needed. Further, in all such implementations, it will be appreciated that any two or more of the operations 202-212 may be executed in a different order than that shown in FIG. 2, or in a nested, iterative, looped, or branched fashion, or in partially or completely overlapping or parallel manner.

In the example of FIG. 2, support text characterizing a support requirement for available information technology (IT) support may be received, this support text being received in sentence form via a graphical user interface (GUI) (202). For example, in FIG. 1, the view generator 106 may be configured to receive the support text 110 by providing the support dialog box 108 within the support client 104. The support requirement may refer to any generalized or specific action requested of an IT support provider, many of which are referenced herein (e.g., request for change, work order, incident resolution, or upgrade request). Specific examples by which the support text 110 may be received through operations of the view generator 106 are provided below, e.g., with respect to FIG. 3.

At least one sentence part within the support text may be identified (204). For example, the sentence part identifier 120, perhaps based on parsed sentence portions received from the sentence parser 118, may identify the types of sentence parts referenced above and described in detail below, e.g., with respect to FIGS. 3-7.

A sentence part score relating the at least one sentence part to at least one support type of the available IT support may be calculated (206). For example, the sentence part score calculator 134 may be configured to calculate a relative likelihood that an identified sentence part is associated with a specific support record type associated with the support records 116.

At least one named entity within the support text may be identified, including executing a query against support-related data, using the support text (208). For example, in some implementations, the various sentence parts provided above may be used to generate queries at the query generator 124, which may then be applied against the various types of support-related data 128, to thereby obtain the query results 126. As referenced above and described in detail below with respect to FIGS. 4 and 5, a resulting sentence part score may be matched to a particular support type, using a trained classification module provided by the trainer 130, or, alternatively, by performing a mapping of the identified sentence parts to corresponding sentence part scores that may have been pre-calculated and stored by the support server 102.

At least one named entity within the support text may be identified, including executing a query against support-related data, using the support text (208). For example, the named entity extractor 122 may utilize sentence parts provided by the sentence part identifier 120, or individual words, phrases, or other content provided directly by the sentence parser 118 but not identified as a sentence part in the sense described above with respect to the sentence part identifier 120. Then, as also described, the query generator 124 may execute a query for individual ones of potential named entities against the various types of support-related data 128. In this way, the query results 126 may be obtained as including individual named entities within the support text 110 and previously characterized as such, directly or indirectly, within the support-related data 128.

A named entity score relating the at least one named entity to the at least one support type may be calculated (210). For example, the named entity score calculator 136 may be configured to determine a relative likelihood that a given named entity should be associated with one or more types of support records.

The at least one sentence part and the at least one named entity may be filled within corresponding fields of a support data record of the at least one support type (212). For example, the support record type identifier 138 may be configured to identify a most-likely support type for the original support types 110 and extracted, identified, and scored sentence parts/named entities, for use of the associated scores in determining one or more potential record support types that may be identified by the support record type identifier 138. In this way, as also described herein, the support record field mapper 142 may then proceed with mapping individual words, sentence parts, and/or named entities within individual support records of the support type identified by the support record type identifier 138.

Figure 3:
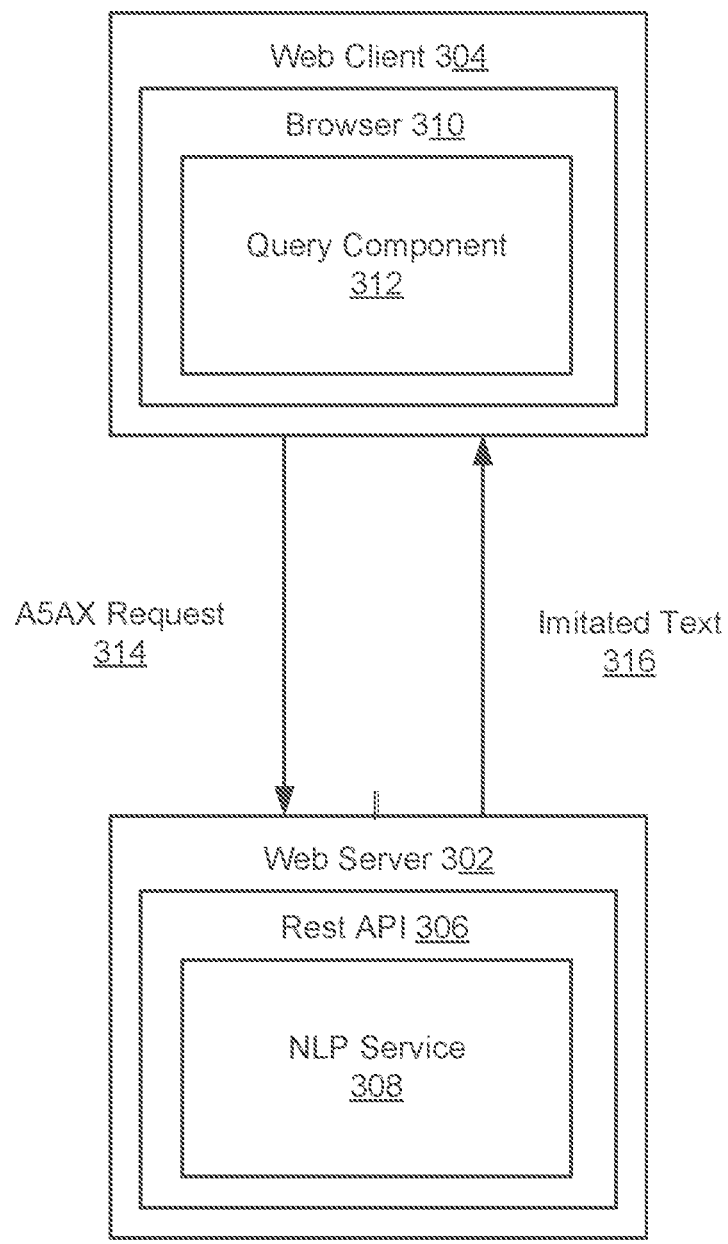
FIG. 3 is a block diagram of an example implementation of portions of the system of FIG. 1.

FIG. 3 is a block diagram of a system 300 illustrating aspects of example implementations of the system 100 of FIG. 1. In the example of FIG. 3, implementation aspects are illustrated for scenarios in which a support server 302, representing a support server 102, interacts remotely with a support client 304, representing the support client 104 of FIG. 1.

FIG. 3 provides an example in which the text analyzer 112 of the system 100 is implemented in conjunction with the support dialog box 108 in an interactive and convenient manner. Further, the implementation of FIG. 3 enables quick, easy, and accurate corrections or other modifications to initial results provided by the text analyzer 112. As a result, operations of the support record generator 114, not specifically illustrated in the specific example of FIG. 3, may subsequently be optimized or otherwise facilitated, to thereby improve an accuracy and completeness of the support records 116.

In the example, as shown, the support server 302 implements a representational state transfer (REST) application program interface (API) 306, which refers to an API constructed in the REST architectural style for designing and implementing network applications. More specifically, such REST-based techniques utilize a stateless, client-server, cashable communications protocol, such as the hypertext transfer protocol (HTTP), to design and implement network applications. Such a REST architecture may utilize HTTP to create, read, update, and/or delete data, and generally provide full featured yet lightweight techniques for interacting with the support client 304.

Of course, the REST API 306 of FIG. 3 is merely a non-limiting example of implementations of the system 100. In other example implementations, other techniques for executing network applications may be used, such as remote procedure calls (RPC), or other web service protocols (e.g., the simple object access protocol (SOAP)).

Further in the example of FIG. 3, a natural language processing (NLP) service 308 is illustrated as being executed in conjunction with the REST API 306. More specifically, the NLP service 308 should be understood to represent a parameterized NLP service configured to implement some or all of the functionalities described above with respect to the text analyzer 112 of FIG. 1.

In this context, natural language processing refers generally to known processing techniques for inputting text or other language expressions that are expressed in an informal or conversational manner, and which are designed to account for the many various ambiguities that may be associated with words, groups of words, or numbers in such context. For example, such ambiguities may include scenarios in which words are used as different parts of speech (e.g., noun or verb), or otherwise have different meanings, and must be judged based on a context of their occurrence or use. In the example of FIG. 3, as may be appreciated from the above discussion of the text analyzer 112 of FIG. 1, as well as from the discussion below provided with respect to FIGS. 4-10, the NLP service 308 may be parameterized for use in the IT support scenarios of the system 100 of FIG. 1. For example, as referenced, numbers of a particular format may be recognized as IP addresses, and names may be recognized as customers who may potentially require IT support, among other examples.

The REST API 306 should be understood to correspond generally to the view generator 106 of FIG. 1, and to provide many of the functionalities described with respect thereto. In particular, for example, the REST API 306 may interact with a browser 310 at the support client 304, utilizing a jQuery component 312. More specifically, the jQuery component 312 should be understood to represent a java script component for executing an implementation of the support dialog box 108 of FIG. 1, and thereby provide for receipt of the support text 110.

More specifically, the jQuery component 312 may represent a specific library of java script code designed to facilitate and otherwise optimize various scripting functions associated with the use of java script in the context of enabling client-side interface interaction. Such java script libraries may be utilized, for example, to enable and facilitate interactions using the Asynchronous Javas Script plus XML (AJAX) techniques. Such AJAX techniques refer to known, client-side techniques for enabling asynchronous web applications used to interact with a server, without requiring either synchronous communication or interference with a current display/behavior of the client during the server communications. Although the AJAX name refers to the use of the eXtensible Markup Language (XML), it is also possible to use java script object notation (JSON) to enable such asynchronous communication.

Consequently, in the example of FIG. 3, an AJAX request 314 may be sent from the browser 310 to the REST API 306, which initially includes the support text 110. Then, processing by the NLP service 308 may result in identification of various sentence parts and named entities within the support text 110, so that annotated text 316 may be transmitted back to the browser 310 which includes identification of the discovered sentence parts and named entities. For example, as described herein, the original support text 110 may be modified within the browser 310 to highlight or otherwise indicate portions of the support text 110 which includes the annotated text 316 (e.g., the identified sentence parts and named entities).

In this way, for example, a user of the support client 304, such as an IT support provider, may easily visualize portions of the support text 110 used to characterize a necessary support record type and associated mapping between portions of the support text 110 and individual data fields thereof. Consequently, the user may indicate agreement or disagreement with results included within the annotated text 316, so that the annotated text 316 may be corrected or otherwise updated accordingly.

Figure 4:
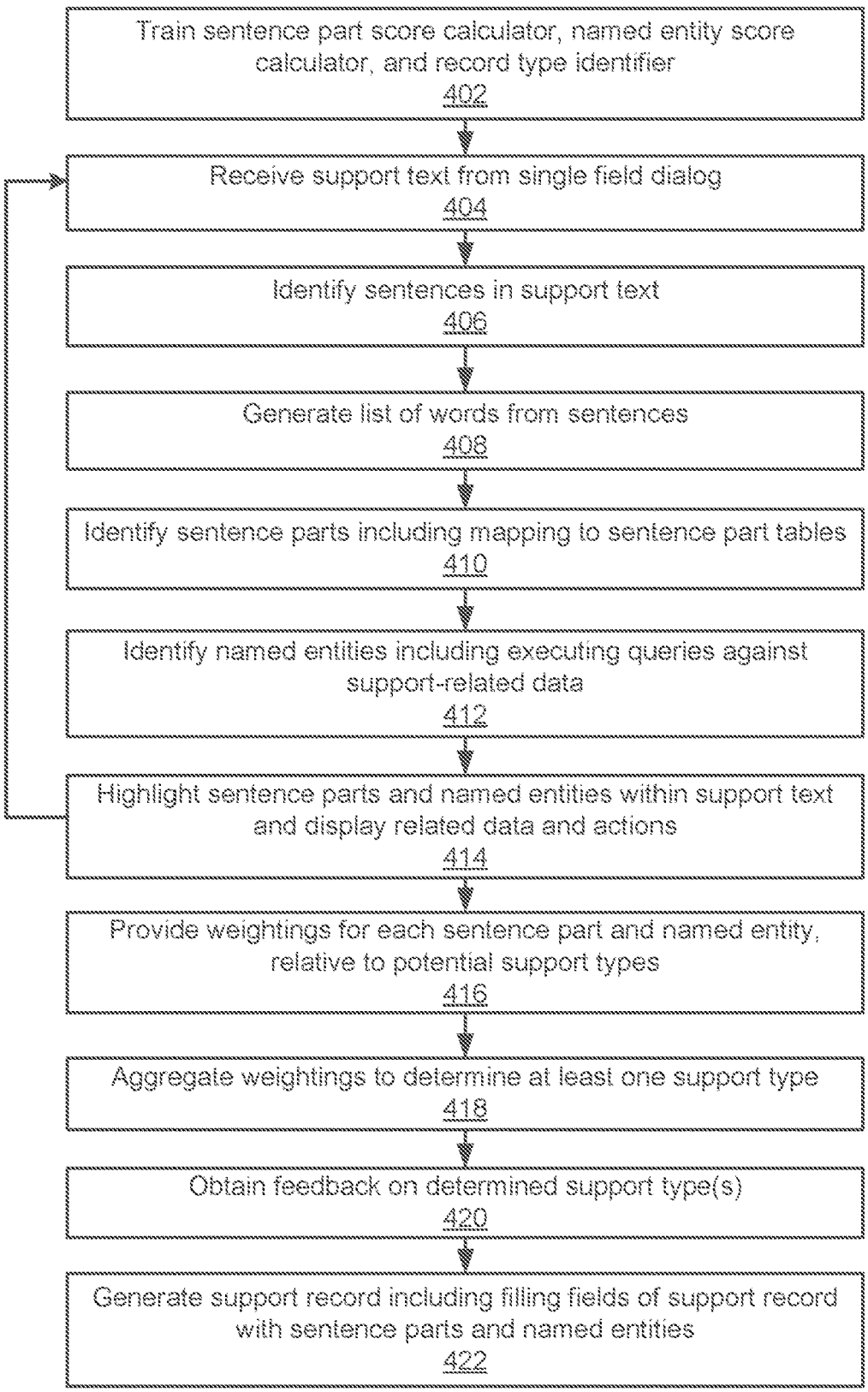
FIG. 4 is a flowchart illustrating more detailed example operations of the systems of FIGS. 1 and 3.

FIG. 4 is a flowchart 400 illustrating more detailed example operations of the system 100 of FIG. 1 and the system 300 of FIG. 3. In the example of FIG. 4, some or all of the sentence part score calculator 134, the named entity score calculator 136, and the support record type identifier 138 may be trained (402), e.g., using the trainer 130 and associated training set 132.

The support text 110 may then be received by way of a single field dialog, such as the support dialog box 108 of FIG. 1 (404). As described, the use of such a single field dialog allows an IT support provider or other user to enter support details, including support details conveyed during a current, direct interaction between the IT support provider and the customer requiring support, in a smooth, natural manner, without interruption associated with moving between different screen items. This approach helps ensure that core items of relevant information that may be required to generate support tickets (e.g., including IT incidents, work orders, customer support tickets, or requests for change) can be gathered from the natural conversation stream between the IT support provider and the customer, entered as the support text 110 within the single field of the support dialog box 108. As such, forms containing one or more sets of individual input dialogs corresponding to core parts of a support record are not required. Moreover, as referenced, the IT support provider is not required to move between multiple dialogs, which is disruptive to the natural conversational flow but which would be required otherwise to gather necessary, relevant information. As a result, the IT support provider may be required to use fewer keystrokes, pointer moves, and such or mouse clicks, or other physical interactions with the support client 104, resulting in a faster, more convenient experience for both the IT support provider and the customer.

During the time that the IT support provider or other user is entering the support text 110, and/or after direct submission of the support text 110 from the customer requiring support, the support text 110 may be communicated to the support server 102/302 using AJAX, and thus to the REST API 306 of FIG. 3, as illustrated by the AJAX request 314. In this way, the NLP service 308 of FIG. 3, parameterized to assist in implementing or otherwise providing the text analyzer 112 of FIG. 1, may receive the support text 110.

In operation, the NLP service 308 of the text analyzer 112 may proceed to identify sentences within the support text 110 (406). For example, such processing may include segmentation of the support text 110 for such identification of distinct sentences within the support text 110. For example, such segmentation may be implemented based on predefined boundary characters, such as period (".") symbols, or other punctuation marks, spaces, characters, or other symbols.

Subsequently, a list of words (including abbreviations and individual numbers) may be generated from the identifying sentences (408). For example, the NLP service 308 implementing the sentence parser 118 of FIG. 1 may execute a tokenization process to generate such a list of words from the discovered sentences. In this context, white spaces and other unneeded or undesired portions of the support text may be removed.

Sentence parts may then be identified, including associated mapping performed with respect to sentence part tables (410). For example, the sentence part identifier 120 associated with the NLP service 308 may perform a tagging operation in which an identification of sentence context is used to identify included sentence parts.

For example, word type, in the sense of part of grammar, may be determined, such as whether a word is a noun, adjective, or verb. Word context, such as whether various words should be considered singly or in combination, may be considered. Moreover, context in this sense should be understood to relate to the type of support being provided, and may include support-related entities such as, e.g., proper nouns, telephone numbers, dates and times, and specialist entities related to the business or activity for which support is being provided. In the latter example, such specialist entities for IT support may include, e.g., common technical descriptors, such as IP addresses, as referenced above. Further, such context may be understood to be imparted through the use of the referenced sentence part tables, in which support-specific terms or phrases may be included, so that specific words from the support text 110 may easily be classified as relating to specific support-relevant concepts. Specific examples for operations associated with such sentence part identification are described herein, e.g., with respect to FIG. 5, below.

The support text may be interpreted in real-time or near real-time, using language analysis of the entered text. In some implementations, embedded indicator symbols may be used, such as, e.g., a specific character marking the fact that the following text will be a reference to a customer's name. Such indicator symbols may be made available to the IT support provider utilizing the system 100/300, e.g., in conjunction with the support dialog box 108 in the browser 310. In this way, key pieces of information relevant to generation of the support data records 116 may be identified quickly, easily, and accurately.

Named entities within the identified words of the support text 110 may be identified, including executing queries against support-related data 128 (412). For example, the named entity extractor 122 may utilize the query generator 124 to execute such queries against the support-related data 128, as described herein. More particularly, the named entity extractor 122 may perform identification operations to characterize each entity isolated by the sentence part identifier 120 (or the sentence parser 118), using a sequence of automated research actions, including, e.g., generic dictionary searches, database queries of a broader support system, or other query techniques. Specific examples for identifying such named entities are provided below, e.g., with respect to FIG. 6 and associated discussion thereof.

As may be appreciated, identified entities will include those relevant to the support process, including names of people, identifiable assets and objects having representative entries in support system databases (or external databases), or other support-relevant entities. Further examples of categories for identification would include specific computer devices, employees, knowledge articles, or historical data related to past support incidents.

By executing such queries in real-time or near real-time, as portions of the support text 110 are received, the text analyzer 112 and associated NLP service 308 may intelligently identify most-relevant supporting resources, which may then be provided, as referenced, in conjunction with the support dialog box 108 and the browser 310. For example, such information may be provided in a selectable list, for easy selection and use thereof by the IT support provider at the support client 104/304. Consequently, a requirement to instigate a search manually may be mitigated or obviated, and the IT support provider may be ensured of being made aware of available, useful resources, with a minimum effort on the part of the IT support provider.

Then, sentence parts and named entities identified within the support text 110 may be highlighted, and related data and actions may be displayed (414), e.g., within the support dialog box 108 of FIG. 1 and/or the browser 310 of FIG. 3. For example, as referenced above, such visual highlighting within the support text 110 serves to identify relevant portions of the support text 110 to the IT support provider or other user. Consequently, subsequent actions may be triggered by clicking on, or otherwise selecting, the highlighted text.

In the example of FIG. 4, weightings for each sentence part and named entity may be provided, relevant to potential support types (416). For example, the sentence part score calculator 134 and the named entity score calculator 136 may assign such weightings as scores for the various sentence parts and named entities. Examples of such weightings are provided below with respect to FIGS. 5 and 6.

The various weightings may then be aggregated or otherwise combined to determine at least one support type to be associated with the support text (418). For example, the support record type identifier 138 may execute such aggregation operations with respect to the calculated scores received from the score calculators 134, 136. Examples of such aggregation operations are also provided below in the context of FIGS. 5 and 6.

In this way, at least one support type may be determined to be associated with the support text 110, whereupon feedback on the determined support type may be obtained (420). For example, as described above with respect to FIG. 1, the score modifier 140 may be utilized to interact with the IT support provider at the support client 104 to make any necessary corrections or additions with respect to the calculations and other operations provided by the score calculators 134, 136, and the support record type identifier 138. Specific examples of such score modifications are described and illustrated below with respect to FIGS. 7 and 8.

Finally in the example of FIG. 4, an individual support record may be generated, including the filling of individual data fields of the support record using the various identified sentence parts and named entities (422). For example, the support record field mapper 142 may map appropriate ones of the sentence parts and named entities to a specific support record of the support type identified by the support record type identifier 138.

The determination of support record type and associated, individual support data record may also be facilitated through the use of a confirmation process executed using interactions with the IT support provider at the support client 104/304. For example, an example of the presentation and confirmation operations for confirming a determined support record type is provided below with respect to FIG. 9, while an example of specific mapping operations used to fill individual support record data fields is provided below, with respect to FIG. 10.

FIG. 5 is a table 500 illustrating example operations of the sentence part score calculator 134 of FIG. 1. As shown, the table 500 includes a column 501 of identified sentence parts obtained from the support text 110. Meanwhile, columns 502, 504, and 506 illustrate example support record types for various types of support that may be associated with the various identified sentence parts of the column 501.

More particularly, as illustrated, the column 501 includes a row 508 in which the word "needs" has been associated by the sentence part identifier 120 with a person. That is, the identified sentence part "needs" has been determined as being classified as an expression of a need of a human being, as opposed, for example, to an expression of a need of a piece of hardware for additional hardware or software.

In this context, the row 508 further indicates relative likelihoods within the columns 502, 504, 506 that the identified sentence part of the column 501 relates to a corresponding type of support record. Specifically, as shown, the column 502 includes a support record of a type related to a "service request," while the column 504 relates to a support record of the type "incident," and the column 506 relates to a support record of the type "change request." As may also be observed from the table 500, the relative likelihoods of the columns 502, 504, 506 (i.e., 0.80, 0.15, and 0.05, respectively) add to 100%, and thus represents all possible support record types that may be associated with the identified sentence part of the column 501, in the example of FIG. 5.

Similar comments apply to the rows 510, 512, and 514. As shown, each of these rows includes an identified sentence part that is also associated with a type "person," in the same sentence as the row 508. As shown, the row 510 includes an identified sentence part "would like," the row 512 includes an identified sentence part "cannot," and the row 514 includes the identified sentence part "can't." Again, each of the rows 510-514 include corresponding relative likelihoods that the included identified sentence part should be associated with a given support record type specified by the columns 502-506.

Further in FIG. 5, rows 516 and 518 illustrate further examples in which identified sentence parts of the column 501 are associated with a different type than the type "person." As shown, the sentence part type illustrated in the rows 516, 518 is the type "verb," so that the included identified sentence parts are understood to be classified as generic parts of speech or grammar. Then, as with the rows 508-514, relative likelihoods of being associated with the support record types of the columns 502-506 are included in corresponding columns.

As may be observed, the same identified sentence part may be classified according to two or more types. For example, as shown, the identified sentence part "can't" is identified as both a person and a verb in rows 514, 516, respectively. In the example, the corresponding relative likelihoods of being associated with the support record type of the columns 502-506 are identical in the illustrated example, but could be different for the same word, depending on such differing classifications thereof.

Thus, FIG. 5 illustrates the sentence part score calculator 134 may be configured to analyze sentence parts identified by the sentence part identifier 120 and the associated, parameterized NLP service 308. Predefined, configurable mapping tables may be used, for each input language, to provide a weighting for each identified sentence part, based on its likelihood of appearing as part of a particular type of support record, as illustrated and described above.

Then, the support record type identifier 138 may proceed to use the provided weightings for each sentence part to determine, specifically, a most likely type of support record. For purposes of providing a simplified example, the weightings may be applied on a simple summed basis.

Then, in the context of such a simplified example, a sentence of the support text 110 may include the phrase "Bob Smith can't open . . . ," which may then be analyzed in accordance with the techniques just described above with respect to FIG. 5 to obtain the following sentence parts and associated weightings:

Parts of sentence:
{type=person; value="Bob Smith"} (unweighted)
{type=verb; value="can't"} (Service Request weighting=0.15, Incident weighting=0.80, Change Request weighting=0.5)
{type=verb; value="open"} (Service Request weighting=0.34, Incident weighting=0.33, Change Request weighting=0.33)

Then, a probability of the original sentence fragment corresponding to a particular type of support record may be expressed as: Σ(request type weightings for each)/Σ(overall weightings). For the example, this expression would then evaluate to a "service request" of likelihood of (0.15+0.34)/2.0=0.24, to an "incident" likelihood of (0.80+0.33)/2.0=0.57, and a "request for change" likelihood of (0.05+0.33)/2.0=0.19.

Thus, in the simplified example, and purely with respect to the identified sentence parts of the table 500 of FIG. 5, the most probable record type for the particular example text fragment would be "incident." Of course, similar analysis could be performed for the entirety of the support text 110. Moreover, it will be appreciated that such operation of the support record type identifier 138 have been described with respect to FIG. 5 only with respect to the sentence part score calculated by the sentence part score calculator 134. As described, such analysis may be supplemented with similar analyses performed by the support record type identifier 138 with respect to an output of the named entity score calculator 136.

Specifically, for example, FIG. 6 is a table 600 illustrating operations of the named entity score calculator 136. Analogously to the table 500, the table 600 includes a column 601 which includes identified name entities, along with columns 602-606 that correspond to specific types of support records. As may be observed, for the sake of simplicity, the column 602, 604, 606 correspond directly to the columns 502, 504, 506 of table 5.

As shown, a row 608 may thus include a named entity of "customers assigned a laptop," while the row 610 may include the named entity "data sentence server," and the row 612 includes the named entity "non-IT employee as customer." As described above, the classification of each such named entity as such may be facilitated through operations of the query generator 124 in querying support-related data 128, and resulting named entity types may ultimately be scored based on associated lookup tables which provide a likelihood that each named entity would appear in a corresponding support record type.

Although not specifically illustrated with respect to the example of the table 600 of FIG. 6, it may be appreciated that the type of summation operations described above with respect to FIG. 5 may similarly be executed in the context of the table 600 of FIG. 6. That is, the support record type identifier 138 may perform a summation, or other appropriate type of aggregation operation, with respect to the contents of the columns 602-606, in order to determine a most probable type of support record for the group of named entities as a whole. Still further, additional summation or other aggregation operations may be performed to combine the results of such summation operations in the context of FIG. 6 with corresponding results obtained in the context of FIG. 5. In this way, as described in detail below with respect to FIG. 9, a final determination of a most likely type of support record may be made for a specific type of support text.

Figure 7:
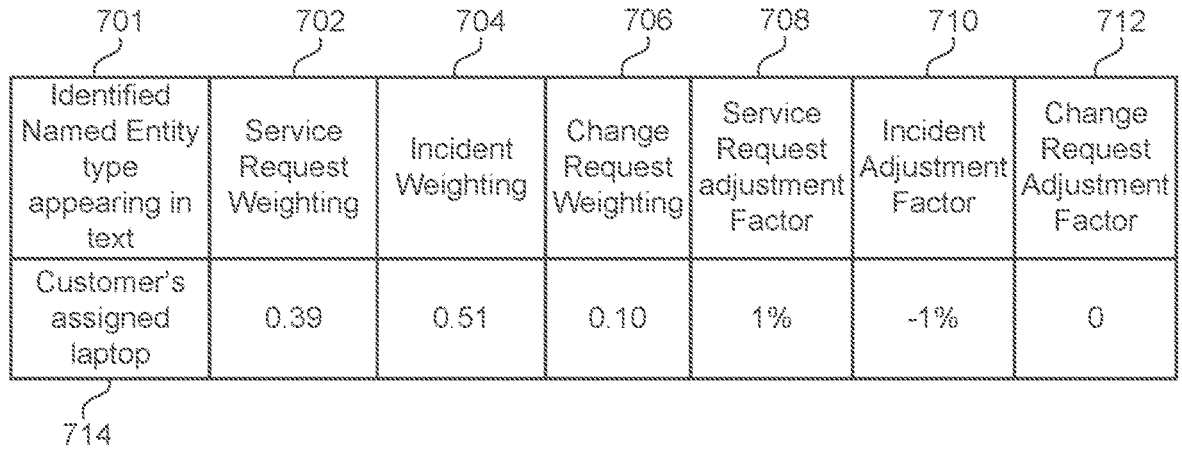
FIG. 7 is a first table illustrating scoring modification used in the system of FIG. 1.
Figure 8:
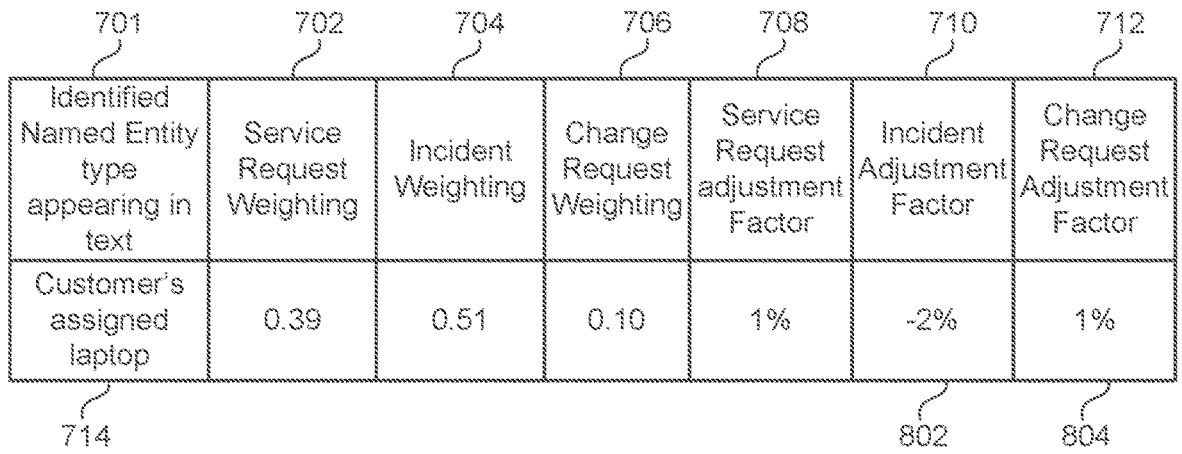
FIG. 8 is a second table illustrating further example scoring modifications used in the systems of FIG. 1 and FIG. 7.

FIGS. 7 and 8 are tables 700 and 800, respectively, illustrating example operations of the score modifier 140 of FIG. 1. As already referenced above with respect to the score modifier 140, such operations generally relate to potential adjustments made to the determined probability or likelihood of each sentence part or named entity corresponding to a particular support record type. Such adjustments maybe made, for example, based on previous accuracy of probabilistic results, administrator-configured adjustments, and/or on other applied adjustment factors.

For example, one example adjustment may include cumulatively-applied adjustment factors, incremented and decremented when a user indicates that an existing support record type identification was incorrect. In such cases, future determinations for each term used for the incorrect classification would be subject to an absolute or proportional adjustment. In some implementations, such adjustment factors may be stored as separate objects, thereby allowing them to be reapplied in situations in which the underlying weight/scores are changed (which may occur, for example, during application of a new set of vendor-supplied data).

In the example above, and with reference to FIG. 7, a simple percentage increment may be used as an example adjustment factor, so that FIGS. 7 and 8 illustrate an illustrative adjustment process. In the example, a customer's design laptop has been detected as a named entity by the named entity extractor 122, and the support record type identifier 138 has determined that the most likely or correct support record type to be applied is "incident." In fact, the IT support provider may indicate that the actual, correct support record type should have been "request." Then, a percentage adjustment factor may be stored and applied for future computations.

Thus, in the table 700, a column 701 identifies identified named entities. Column 702-706 identify potential support record types, as already described with respect to corresponding columns 502-506 of FIG. 5 and 602-606 of FIG. 6. Then, a column 708 may be included for the provision of a percentage adjustment factor for the service request likelihood of columns 702. Similarly, a column 710 may include an incident adjustment factor corresponding to the incident weighting of the column 704, and the column 712 may include a change request adjustment factor corresponding to the change request weighting of the column 706.

Then, in the example just referenced, a row 714 may include a named entity of "customers assigned laptop." The corresponding likelihood in column 702-706 thus corresponds to the likelihoods of the row 608 of FIG. 6. As shown, the column 708 includes a 1% adjustment factor for the service request weighting of the column 702, while the column 710 indicates a negative 1% adjustment factor for the incident weighting of the column 704. Finally in the example of the table 700, no adjustment factor is included in the row 714 for the column 712.

As referenced, and illustrated with respect to FIG. 8, the various adjustment factors of the column 708-712 may be adjusted incrementally, e.g., in conjunction with each determination of support record type made by the support record type identifier 138. For example, during a subsequent receipt of support text, a determination of "incident" may again be made incorrectly, and thereafter corrected to "change request." Then, as shown in cell 802 of the table 800, the incident adjustment factor of the column 710 may be incremented from −1% to −2%, while the adjustment factor for "change request" in column 712 is illustrated as being incremented to the value of 1% in the cell 804.

Thus, FIG. 7 illustrates and example in which a determination of "incident" is corrected to "service request," and a corresponding adjustment factor is applied. After receipt of subsequent support text, a determination of "incident" is again changed, but this time to "change request." As shown in the example of FIGS. 7, 8, such scenarios may result in the iterative, incremental changes illustrated, so that, over time, an accuracy of the support record type identifier 138 may be improved.

FIG. 9 is a table 900 illustrating operations of the support record type identifier 138 in presenting and confirming an identified support record type. That is, as described, the support record type identifier 138 is configured to execute a summation or other type of aggregation operation, based on scores received from the score calculators 134, 136, to thereby obtain one or more most likely types of support record to be generated (subject to modifications made and tracked in conjunction with the score modifier 140, as just described).

In the example of FIG. 9, the table 900 illustrates an example technique for presenting such selections of support record types to the IT support provider or other user of the system 100, for confirmation or modification thereof. Of course, the illustrated presentation method is intended merely as a non-limiting example, and actual presentation methods may vary according to preferences of the system designer or administrator.

In the example of FIG. 9, the table 900 includes a column 901 representing a computed probability of most likely record type, while the column 902 illustrates corresponding actions that may be taken in conjunction therewith. As shown, a row 904 indicates that if a computer probability is 70%-100%, the action taken may include an automatic selection of the associated support record type, with retrospective correction allowed. If the computed probability of the most likely support record type falls between 50%-70%, as shown in the row 906, then the user may be presented with a preselected option for confirming the determined, most likely record type, along with an option to implement one quick confirmation thereof or to select from a list of other possible support record types, ordered by probability. Finally in the example of FIG. 9, as shown in the row 908, if the computer probability falls under 50%, then the user may simply be presented with an open selection of potential support record types, again ordered by probability.

Of course, again, FIG. 9 is intended merely as an example. The various thresholds of the rows 904-908 may thus be adjusted in accordance with a preference of an administrator, and the various associated actions may be similarly modified or adjusted in any desired, suitable fashion.

FIG. 10 is a table 1000 illustrating example operations of the support record field mapper 142 of FIG. 1. That is, after selection of the appropriate support record type, as just described with respect to FIG. 9, the support record field mapper 142 may proceed to populate the support record in question, i.e., may proceed to fill individual data fields thereof using identified sentence parts and named entities, in accordance with configurable or hard-coded mappings.

In the example of FIG. 10, a set of mappings that may be used in conjunction with the above examples may be executed with respect to one or more support record types, and for the named entity "customer's assigned laptop." Of course, such mappings may vary depending on the type of support record type selected.

Specifically, as shown in the table 1000, a column 1001 corresponds to an identified record type, while a column 1002 specifies required mappings for the identified named entity "customer's assigned laptop." Then, in the example, in a row 1004, a support record type of "incident" is illustrated as corresponding to mappings associated with related configuration items (asset record). In the row 1006, a support record type of "request" is illustrated as being associated with mapping to a field "tag number" corresponding to a tag number of the asset in question (i.e., the customer's laptop). Finally in FIG. 10, a row 1008 indicates that the support record type "request for change" may not be associated with any currently available mapping.

Thus, FIGS. 1-10 and associated description illustrate features and functions which enable an IT support provider or other user to obtain information regarding the potential IT support issue in a natural, conversational manner. In such context, a support record type may be determined during the course of a conversation between the IT support provider and a customer or other user requiring assistance, or immediately thereafter. Consequently, it is unlikely to be necessary to defer decisions on record types to be created, or to experience a need to correct a previously-created support record that was generated incorrectly. Moreover, support data may be entered in correct data fields of support data records in the first instance, minimizing the chance for error or omission of necessary data.

Further, the IT support provider is enabled to collect specific, core pieces of support data required to build each support record. Such items of information may be defined, for example, by operational requirements of individuals and teams dealing with the various types of support record on behalf of the customer (and may also be documented in industry frameworks, such as the IT infrastructure library (ITIL)). Thus, the IT support provider obtains necessary information quickly, with minimal requirements for numbers of different interface components used.

Further, in scenarios in which an IT support provider receives support text directly from the customers, such as may occur when using email interfaces, IT support providers need not retrospectively inspect each such submission after the fact to determine its correct support record type and break out individual pieces of required information therefore. Instead, the systems and methods of FIGS. 1-10 may perform such inspections, determinations, and extractions, and may thereafter input required support data into the various, multiple data fields of the selected support record of the corresponding support record type.

Implementations of the various techniques described herein may be implemented in digital electronic circuitry, or in computer hardware, firmware, software, or in combinations of them. Implementations may implemented as a computer program product, i.e., a computer program tangibly embodied in a non-transitory information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system including instructions stored on a non-transitory computer readable storage medium and executable by at least one processor, the system comprising:
   a view generator configured to cause the at least one processor to receive support text characterizing a support requirement for at least one Information Technology (IT) support provider, the support text being received via a user interface (UI);
   a text analyzer configured to cause the at least one processor to perform natural language processing on the support text and thereby identify at least one sentence part and at least one named entity within the support text; and
   a support record generator configured to cause the at least one processor to relate each of the at least one sentence part and the at least one named entity to a support record type, and further configured to cause the at least one processor to generate a support data record for the support requirement, including filling individual fields of the support data record using the at least one sentence part and the at least one named entity, wherein the support record generator includes
- a sentence part score calculator configured to provide a sentence part score for the at least one sentence part, the sentence part score representing a first probabilistic determination that the at least one sentence part is associated with each of a plurality of support record types, including the support record type,
- a named entity score calculator configured to provide a named entity score for the at least one named entity, the named entity score representing a second probabilistic determination that the at least one named entity is associated with each of the plurality of support record types, including the support record type, and
- a support record type identifier configured to determine the support record type based on a combination of the first probabilistic determination and the second probabilistic determination.

2. The system of claim 1, wherein the view generator is further configured to provide the UI as a graphical user interface (GUI) with a single field dialog box for receiving the support text.

3. The system of claim 1, wherein the text analyzer includes a sentence parser configured to identify individual sentences within the support text and parse the individual sentences to obtain individual words and numbers.

4. The system of claim 1, wherein the text analyzer includes a sentence part identifier configured to identify and label the at least one sentence part within the support text, based on a context of a use thereof within the support text.

5. The system of claim 1, wherein the text analyzer includes a named entity extractor configured to execute at least one query against support-related data to identify the at least one named entity of the at least one sentence part.

6. The system of claim 2, wherein the support record generator is configured to present the support record type among a plurality of support record types, and to receive confirmation of correct association of the support record type with the support text, using the GUI.

7. The system of claim 1, wherein the support record generator is configured to execute at least one machine learning algorithm to classify the at least one sentence part and the at least one named entity with respect to a plurality of support record types, including the support record type.

8. The system of claim 1, wherein the at least one IT support provider includes at least one IT support agent.

9. The system of claim 1, wherein the support text is received in sentence form.

10. The system of claim 1, wherein the support record generator is configured to generate an initial support record type, and includes a score modifier configured to receive a modification of the initial support record type, in response to a determination that the initial support record type does not correspond to the support text, wherein the score modifier is configured to adjust one or both of the sentence part score and the named entity score and thereby enable generation of the support record type based thereon.

11. The system of claim 1, wherein the support record generator includes a support record field mapper configured to fill individual fields of the support data record using the at least one sentence part and the at least one named entity, including mapping a label identifying the at least one sentence part and a name of the at least one named entity, to corresponding ones of the individual fields of the support data record.

12. A method comprising:
- receiving support text characterizing a support requirement for at least one Information Technology (IT) support provider, the support text being received via a user interface (UI);
- identifying at least one sentence part within the support text;
- calculating a sentence part score relating the at least one sentence part to at least one support type provided by the at least one IT support provider;
- providing the sentence part score for the at least one sentence part, the sentence part score representing a likelihood that the at least one sentence part is associated with each of a plurality of support types, including the at least one support type;
- identifying at least one named entity within the support text, including executing a query against support-related data, using the support text;
- calculating a named entity score relating the at least one named entity to the at least one support type;
- providing the named entity score for the at least one named entity, the named entity score representing a likelihood that the at least one named entity is associated with each of the plurality of support types, including the at least one support type;
- combining the sentence part score and the named entity score to represent a likelihood that the support requirement is for the at least one support type; and
- filling the at least one sentence part and the at least one named entity within corresponding fields of a support data record of the at least one support type, including mapping the at least one sentence part and the at least one named entity to populate the corresponding fields of the support data record.

13. The method of claim 12, wherein the identifying at least one sentence part includes performing natural language processing of the support text.

14. The method of claim 12, wherein the at least one IT support provider includes at least one IT support agent.

15. The method of claim 12, wherein the support text is received in sentence form.

16. A computer program product including instructions recorded on a non-transitory computer readable storage medium and configured, when executed by at least one semiconductor processor, to cause the at least one semiconductor processor to:
- receive support text characterizing a support requirement for at least one Information Technology (IT) support provider, the support text being received via a user interface (UI);
- identify at least one sentence part within the support text;
- calculate a sentence part score relating the at least one sentence part to at least one support type provided by the at least one IT support provider;
- provide the sentence part score for the at least one sentence part, the sentence part score representing a likelihood that the at least one sentence part is associated with each of a plurality of support types, including the at least one support type;
- identify at least one named entity within the support text, including executing a query against support-related data, using the support text;
- calculate a named entity score relating the at least one named entity to the at least one support type;
- provide the named entity score for the at least one named entity, the named entity score representing a likelihood that the at least one named entity is associated with each of the plurality of support types, including the at least one support type;

combine the sentence part score and the named entity score to represent a likelihood that the support requirement is for the at least one support type; and fill the at least one sentence part and the at least one named entity within corresponding fields of a support data record of the at least one support type, including mapping the at least one sentence part and the at least one named entity to populate the corresponding fields of the support data record.

17. The computer program product of claim 16, wherein the instructions, when executed, are further configured to cause the at least one processor to:

execute at least one machine learning algorithm to classify the at least one sentence part and the at least one named entity with respect to a plurality of support types, including the at least one support type.

18. The computer program product of claim 16, wherein the instructions, when executed, are further configured to cause the at least one processor to:

fill individual fields of the support data record using the at least one sentence part and the at least one named entity, including mapping a label identifying the at least one sentence part and a name of the at least one named entity, to corresponding ones of the individual fields of the support data record.

19. The computer program product of claim 16, wherein the instructions, when executed, are further configured to cause the at least one processor to:

present the support type among a plurality of support types, and to receive confirmation of correct association of the support type with the support text, using the UI.

* * * * *